United States Patent
Sarmento et al.

(10) Patent No.: US 10,049,163 B1
(45) Date of Patent: Aug. 14, 2018

(54) CONNECTED PHRASE SEARCH QUERIES AND TITLES

(71) Applicant: Amazon Technologies, Inc., Reno, NV (US)

(72) Inventors: Luis Antonio Diniz Fernandes de Morais Sarmento, Seattle, WA (US); Edward Thomas Banti, Seattle, WA (US); Sean Phillip Forde, Seattle, WA (US); Paul Daniel Jaye, Seattle, WA (US); Zheshen Wang, Seattle, WA (US); Gareth Charles Farrington, Seattle, WA (US); Tiffany Celeste Michelon, Seattle, WA (US); Aurash Steven Abnar Behbahani, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 233 days.

(21) Appl. No.: 13/921,986

(22) Filed: Jun. 19, 2013

(51) Int. Cl.
*G06F 17/30* (2006.01)

(52) U.S. Cl.
CPC .............................. *G06F 17/30867* (2013.01)

(58) Field of Classification Search
CPC ................................................ G06F 17/30867
See application file for complete search history.

(56) References Cited

U.S. PATENT DOCUMENTS

| | | | | |
|---|---|---|---|---|
| 6,044,347 | A * | 3/2000 | Abella | G10L 15/18 704/272 |
| 7,603,349 | B1 * | 10/2009 | Kraft | G06F 17/30867 |
| 7,739,116 | B2 * | 6/2010 | Miyamoto et al. | 704/270 |
| 8,359,318 | B2 * | 1/2013 | Garbe | G06F 17/301 707/622 |
| 2004/0030780 | A1 * | 2/2004 | Walters | 709/225 |
| 2007/0061128 | A1 * | 3/2007 | Odom et al. | 704/4 |
| 2012/0036123 | A1 * | 2/2012 | Hasan | G06F 17/30386 707/723 |
| 2012/0078979 | A1 * | 3/2012 | Ghimire | G06F 17/30648 707/805 |
| 2012/0239667 | A1 * | 9/2012 | Vysyaraju et al. | 707/749 |
| 2013/0290320 | A1 * | 10/2013 | Zhu | G06F 17/30861 707/723 |
| 2016/0063115 | A1 * | 3/2016 | Ayan | G06Q 50/01 707/722 |

* cited by examiner

Primary Examiner — Rehana Perveen
Assistant Examiner — Huen Wong
(74) Attorney, Agent, or Firm — Thomas | Horstemeyer, LLP; Michael J. D'Aurello; Jason M. Perilla (57) ABSTRACT

Aspects of connected phrase search queries and titles are described. In one embodiment, a phrase in a search string may be identified with reference to a compilation data store. The compilation data store may include various collaborative, taxonomy, and brand name data, for example. After a phrase is identified in the search string, a search query may be generated based on the phrase. For example, a catalog of items may be queried to generate a query result, and the query result may be parsed for display to a user. In various embodiments, a plurality of phrases may be identified in a search string, and a plurality of search queries may be generated based on combinations of the phrases. In this manner, more search results may be obtained, especially for constrained search strings. The identification of phrases may also be applied to generate variations on titles, in certain embodiments.

20 Claims, 9 Drawing Sheets

Search: | Acme Brand Blue Ringo Rolling Tool Organizer |

Search 1: "[Acme Brand] ~~Blue~~ [Ringo Rolling [Tool Organizer]]"  _402_

1. Acme Ringo Rolling Tool Organizer
2. Acme Ringo Rolling Tool Organizer # 2
3. Acme Ringo Rolling Tool Organizer # 3
• • • See all 15 results Search 2: "[Acme Brand] ~~Blue [Ringo Rolling~~ [Tool Organizer]]"  _404_

1. Acme Tool Organizer
2. Acme Tool Organizer # 2
3. Acme Tool Organizer # 3
• • • See all 32 results Search 3: "~~[Acme Brand] Blue [Ringo Rolling~~ [Tool Organizer]]"  _406_

1. Tool Organizer A
2. Tool Organizer B
3. Tool Organizer C
• • • See all 64 results Search 4: "~~[Acme Brand] Blue~~ [Ringo Rolling [Tool Organizer]]"  _408_

1. • • •
2. • • •
3. • • •
• • • See all 21 results

CONNECTED PHRASE SEARCH QUERIES AND TITLES

BACKGROUND

Online merchant websites may provide users with the ability to search for and identify a product for purchase using a word search string. In some cases, if the search string contains too many words or terms, for example, a query using the search string may not produce any query results. Here, a merchant website may indicate that no products or items match the search string. In this context, when the search string contains too many words or terms and little or no query results are returned, the search string may be considered to be overly constrained.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

As discussed above, online merchant websites may provide users with the ability to search for and identify a product for purchase using a word search string. In some cases, if the search string contains too many words or terms, for example, a query using the search string may not produce or surface any query results. Here, a merchant website may indicate that no products or items match the search string. In this context, when the search string contains too many words or terms and little or no query results are returned, the search string may be considered to be overly constrained.

In this context, aspects of connected phrase search queries and titles are described. In one embodiment, a phrase in a search string may be identified with reference to a compilation data store. The compilation data store may include various collaborative, taxonomy, and brand name data, for example. After a phrase is identified in the search string, a search query may be generated based on the phrase. For example, a catalog of items may be queried to generate a query result, and the query result may be parsed for display to a user. In various embodiments, a plurality of phrases may be identified in a search string, and a plurality of search queries may be generated based on combinations of the phrases. In this manner, more search results may be obtained, especially for constrained search strings. The identification of phrases may also be applied to generate variations on titles, in certain embodiments.

In the following discussion, a general description of a system for generation of connected phrase search queries and titles and its components is provided, followed by a discussion of the operation of the same.

Figure 1:
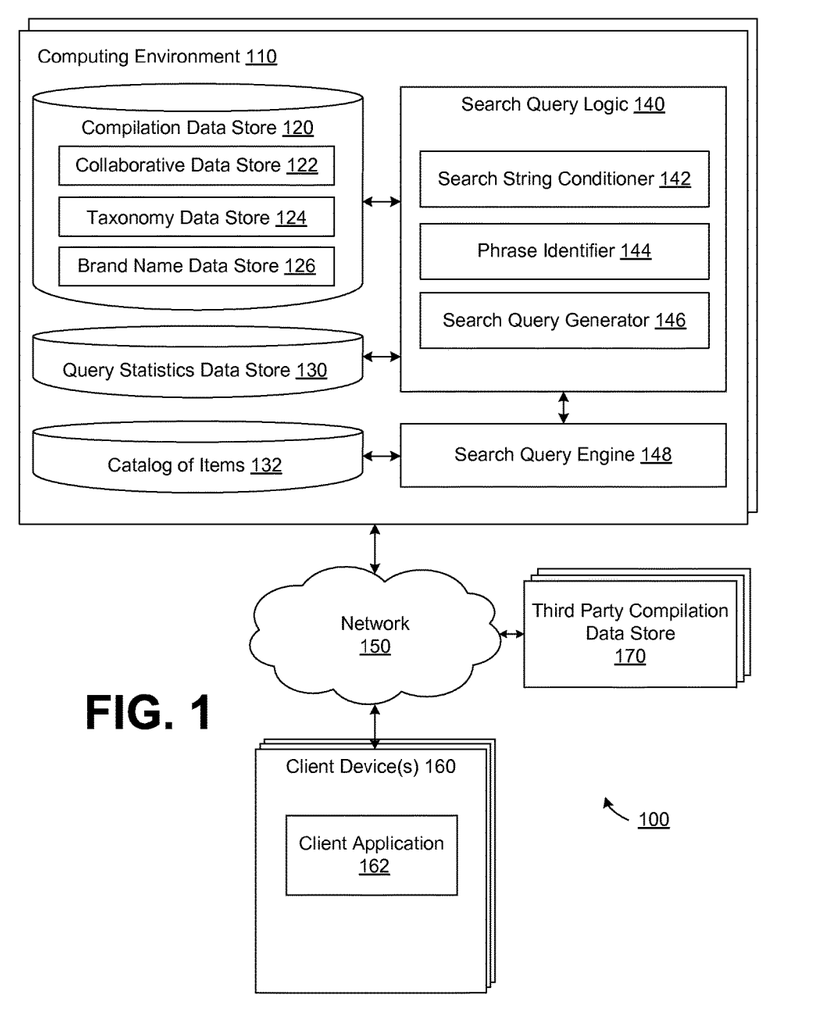
FIG. 1 illustrates a networked environment for the generation of connected phrase search queries and titles according to various embodiments of the present disclosure.

FIG. 1 illustrates a networked environment 100 for the generation of connected phrase search queries and titles according to various embodiments of the present disclosure. The networked environment 100 comprises a computing environment 110, a network 150, a client device 160, and a third party compilation data store 170.

The computing environment 110 may be embodied as a computer, computing device, or computing system. In certain embodiments, the computing environment 110 may comprise one or more computing devices arranged, for example, in one or more server or computer banks. The computing device or devices may be located at a single installation site or distributed among different geographical locations. For example, the computing environment 110 may include a plurality of computing devices that together comprise a cloud computing resource, a grid computing resource, and/or other distributed computing arrangement. In some cases, the provider computing environment 110 may comprise an elastic computing resource where an allotted capacity of processing, network, storage, or other computing-related resources varies over time.

The network 150 may comprise the Internet, intranets, extranets, wide area networks (WANs), local area networks (LANs), wired networks, wireless networks, other suitable networks, or any combinations thereof. It is noted that the provider computing environment 110 may communicate with the customer client device 160 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 150, without limitation.

The computing environment 110 comprises various functional (e.g., computer-readable instruction) and/or logic (e.g., device, circuit, or processing circuit) elements that may be directed or executed by the computing environment 110 according to various embodiments described in further detail herein. As illustrated in the example embodiment of FIG. 1, the computing environment 110 comprises a compilation data store 120, a query statistics data store 130, a catalog of items 132, search query logic 140, and a search query engine 148. Among other features described herein, the computing environment 110 is configured to identify phrases in search strings received from the client device 160, and generate search queries including one or a combination of the phrases, for example.

In one embodiment, the computing environment 110 may be an environment of one or more online merchants. In this context, the search query logic 140 and the search query engine 148 may facilitate the presence of the online merchants in the networked environment 100, by assisting customers with the identification of products or services for purchase. Either or both of the search query logic 140 and the search query engine 148 may comprise one or more logic elements that perform various functions described herein. For example, as illustrated in FIG. 1, the search query logic 140 comprises a search string conditioner 142, a phrase identifier 144, and a search query generator 146. Further details on the features and aspects of the elements of the search query logic 140 are described below. Generally, the search query engine 148 submits a query to the catalog of items 132 and, in response, the catalog of items 132 returns products or services that match the query. In various embodiments, the catalog of items 132 may be centrally located or distributed among different geographic locations. The catalog of items 132 may include data on all products and services available for sale, license, or subscription, for example, by one or more sellers, resellers, or merchants operating an electronic commerce system according to various partnerships and/or agreements.

As illustrated in FIG. 1, the compilation data store 120 comprises a collaborative data store 122, a taxonomy data store 124, and a brand name data store 126. As further described below, each of the collaborative data store 122, the taxonomy data store 124, and the brand name data store 126 may be relied upon by the computing environment to identify phrases within search strings.

The collaborative data store 122 may comprise data from a collaborative-type of online encyclopedia, dictionary, library, or lexical database of words and terms. Additionally or alternatively, the collaborative data store 122 may comprise data from a collaborative-type online social media network. In this context, it should be appreciated that the collaborative data store 122 is updated over time, by a collaboration of users (e.g., by "crowdsourcing"), with the latest information on products, services, research, movies, music, and other "pop culture," etc., without limitation. It should be appreciated that, in certain embodiments, the collaborative data store 122 may further include or be augmented with data from the third party compilation data store 170. Generally, the third party compilation data store 170 comprises data similar to the data in the collaborative data store 122, although being maintained by a third party. In certain embodiments, the third party compilation data store 170 may be maintained by a certain group, organization, or company as a reference available via the network 150.

The taxonomy data store 124 may comprise data on the manner and/or nature in which products and services are commonly titled and/or described. In other words, the taxonomy data store 124 may include data on the general manner in which words are typically arranged to describe or identify certain products and or services. For example, the taxonomy data store 124 may include data that identifies the individual words "peanut" and "butter," in combination, as a likely phrase for the identification of "peanut butter." Similarly, the taxonomy data store 124 may include data that identifies other likely combinations of words within the context of certain products or services, such as "engine oil," "floor mat," "bath salts," etc.

The brand name data store 126 may comprise data on names and/or titles of common products and services. For example, the brand name data store 126 may include data on various product names, brand names, trade names, trademarks, etc. In certain aspects, the taxonomy data store 124 and the brand name data store 126 may be updated over time as new products and/or services are added to the catalog of items 132.

The query statistics data store 130 may comprise data related to search strings and the composition of search strings received by the computing environment historically. In other words, the query statistics data store 130 may maintain data on the frequency in which certain words, terms, and phrases are included within search strings received by the computing environment 110. As further described below, this data on the frequency of words, terms, and phrases in search strings may be relied upon by the computing environment 110 to further define or generate alternate search queries.

The client device 160 is representative of one or a plurality of client devices of users or customers. The client device 160 may comprise any processing circuit or processor based device or system, including those embodied in the form of a desktop computer, a laptop computer, a personal digital assistant, a cellular telephone, a set-top box, a music or media player, or a tablet computer, among other example computing devices and systems.

The client device 160 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display, indicator lights, speakers, etc. The display may comprise, for example, one or more cathode ray tubes (CRTs), liquid crystal displays (LCDs), gas plasma-based flat panel displays, LCD projectors, or other types of display devices, etc.

As illustrated in FIG. 1, the client device 160 may execute applications such as client application 162, which is representative of one application that may be executed on the client device 160. In one embodiment, the client application 162 may comprise a browser application that interacts with the computing environment 110 via the network 150. To this end, the client application 162 may comprise, for example, an available off-the-shelf hypertext-based internet browser such as INTERNET EXPLORER® sold by Microsoft Corporation of Redmond, Wash., or MOZILLA FIREFOX® which is promulgated by Mozilla Corporation of Mountain View, Calif., or any other type of browser, without limitation. Alternatively, the client application 162 may comprise another type of application that interacts with the computing environment using a suitable protocol via the network 150. Generally, when executed in the client device 160, the client application 162 renders a webpage or similar user interface on a display of the client device 160.

Figure 2:
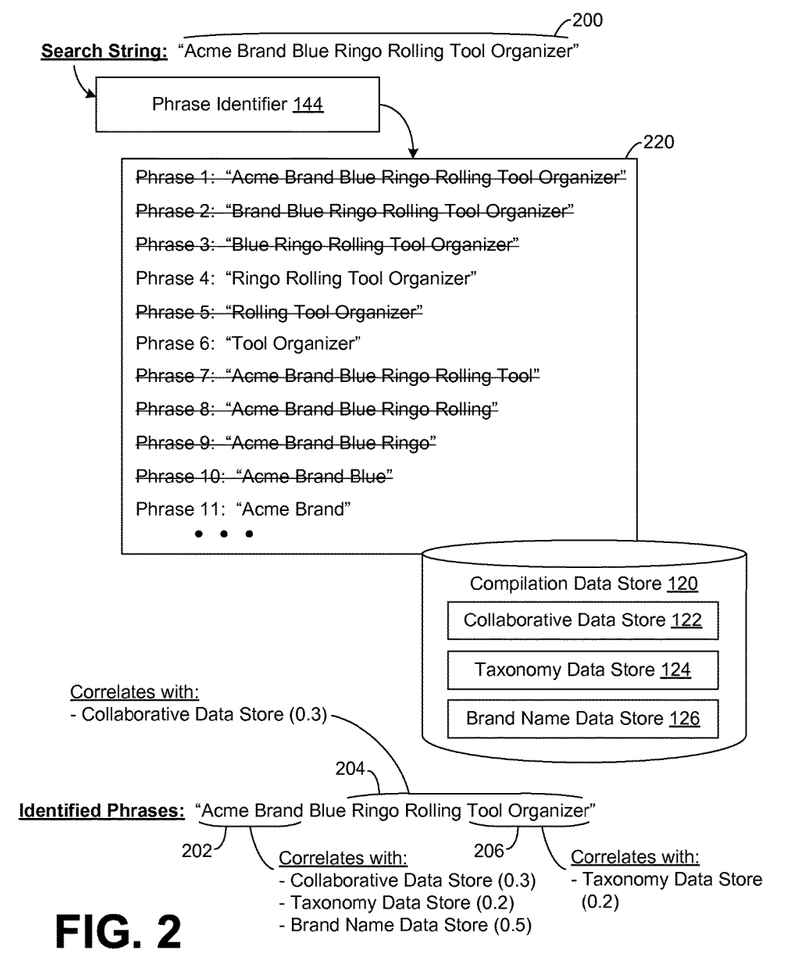
FIG. 2 illustrates an example search string and the identification of phrases in the search string performed by the computing environment of FIG. 1 according to various embodiments of the present disclosure.
Figure 3:
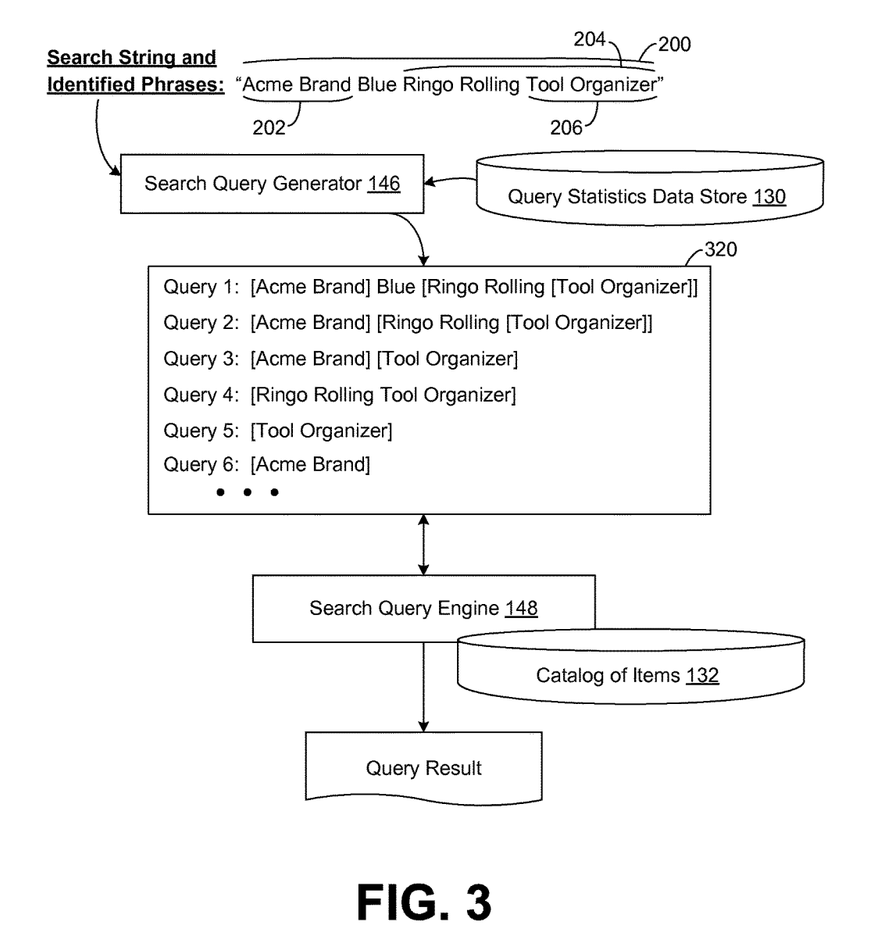
FIG. 3 illustrates example phrases and the generation of search queries performed by the computing environment of FIG. 1 according to various embodiments of the present disclosure.
Figure 4:
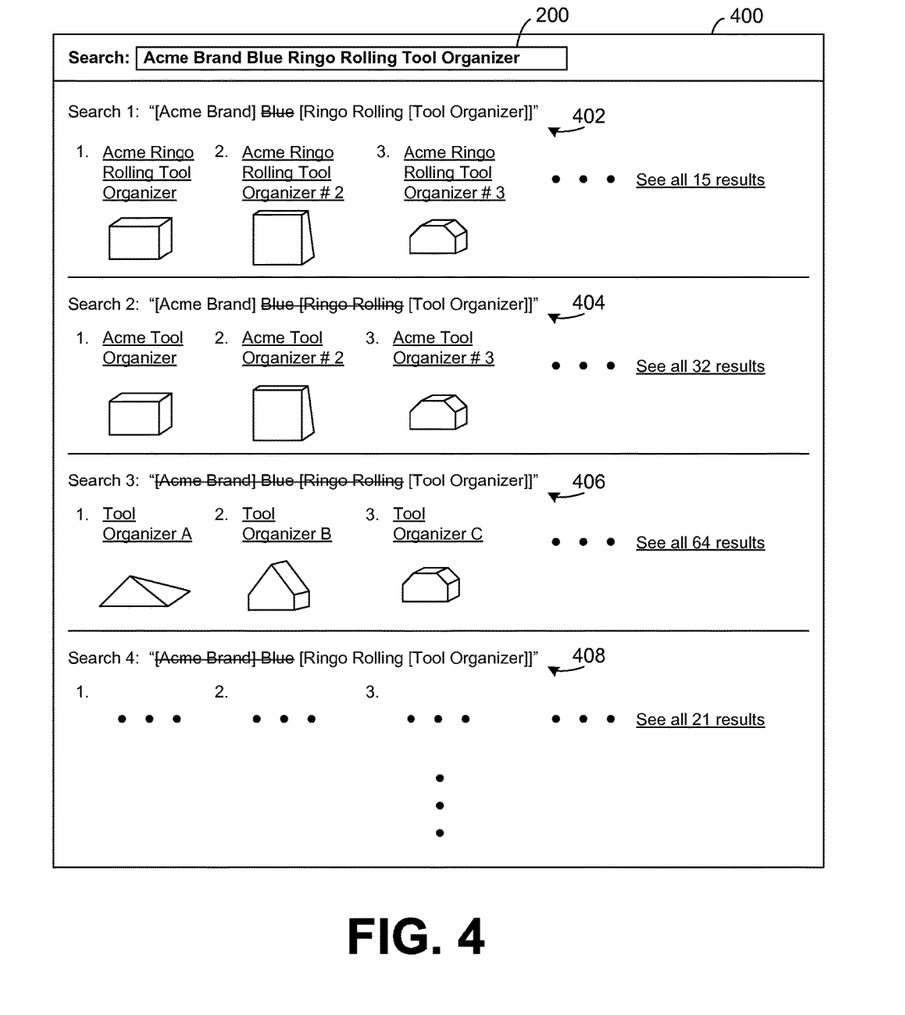
FIG. 4 illustrates an example display of search query results provided by the computing environment of FIG. 1 according to various embodiments of the present disclosure.

Next, a more detailed description of the operation of the computing environment 110 in the networked environment 100 is provided with reference to FIGS. 2-4. Before turning to FIG. 2, it may be assumed among various examples described herein that a user of the client device 160 manipulates the client application 162 to search for one or more items, products, or services offered for purchase or subscription by an online merchant through the computing environment 110. Additionally or alternatively, the user may be searching for something other than products or services, for example. Here, it is noted that the concepts related to the operation of the computing environment 110 are applicable in contexts other than that of an electronic commerce marketplace.

In various embodiments, a user of the client device 160 may rely upon the client application 162 to submit a search string to the computing environment 110, to search for one or more items, products, or services offered for purchase or subscription. After receiving the search string, the search query engine 148 of the computing environment 110 may submit a search query to the catalog of items 132 based on the search string. In response to the query to the catalog of items 132, the catalog of items 132 may return a query result. The computing environment 110 may then parse and serve one or more network pages back to the client device 160, for example, to display the query result in connection with the search query.

When relying upon the client application 162 to submit a search string to the computing environment 110, a user may enter the search string into a search text box or field, for example. It is noted that, when entering a search string, certain users are apt to enter long and verbose search strings rather than directed, succinct, keywords. For example, a user that wishes to buy a hat for the beach might enter a search string such as: <"I am looking for a hat for the beach having a yellow ribbon and large rim for protection against the sun">. Such a long and verbose search string may be unlikely to result in a query that produces a meaningful group of products to review for purchase, due to the fact that the search string is overly constrained with too many words. Such a search string may even result in the return of zero products in response to a corresponding query submitted to a product catalog, etc. In some cases, a user may be discouraged by the return of zero results in response to a query. Certain users may even conclude that the online merchant does not carry any items in connection with the search string. As a result, the user may be discouraged from making a purchase with the online merchant.

In the context provided above, it is noted that, upon receipt of a lengthy search string, different queries may be formulated based upon one or more combinations of words in the search string. For example, one or more words may be dropped, in various combinations, from the original search string to create different search queries, and a search may be performed with one or more of the different search queries. The results of each of the different search queries may be displayed respectively or in combination as a result in response to the original search string.

However, it is noted that certain words in a search string may form part of a phrase, term, catchphrase, expression, slogan, phraseme, collocation, idiom, trade name, trademark, or similar group of words, or any combination thereof (i.e., "phrase" as generally used herein), for example, without limitation. For instance, a combination of words in a search string may form the name of a character, a television show or series, a musical band, etc. For a phrase to maintain its meaning, the taxonomy (e.g., arrangement and/or order) of the words in the phrase should be maintained. In this context, because certain words in a search string may form part of a phrase, it is noted that any variation on the words in the search string used to generate a search query should avoid destruction or modification of the phrase. For example, when dropping one or more words form the search string <"black and grey acme brand high top sneakers" to generate a search query, it is noted that dropping the word "top" from "high top sneakers" should be avoided if the words "high top sneakers" is identified as a phrase. Here, "high top sneakers" may be recognized as a phrase due to the fact that it corresponds to a certain type, segment, or classification of sneakers, by product name taxonomy, for example.

Turning to FIG. 2, an example search string 200 and the identification of phrases 202, 204, and 206 in the search string, as performed by the computing environment 110 of FIG. 1 according to various embodiments of the present disclosure, is illustrated. In FIG. 2, the example search string 200<"Acme Brand Blue Ringo Rolling Tool Organizer"> is provided to the computing environment 110 from a user of a client device 160, for example, for a search of products for sale by an online merchant. It should be appreciated that the search string 200 is provided by way of example only, as any other arrangement or combination of words may be provided by a user as a search string according to the embodiments described herein.

Before identifying phrases in the search string 200, in certain embodiments, the search string conditioner 142 may condition the search string 200. For example, the search string conditioner 142 may perform a spell check correction on one or more words in the search string 200, or remove so-called "stop words" known to have little relevance to a search. Examples of such words include "a," "in," "the," or other words as can be appreciated.

According to other aspects described herein, the phrase identifier 144 uses the search string 200 to identify one or more phrases among the words in the search string. Particularly, the phrase identifier 144 groups a set of words from the search string into a candidate phrase, compares the candidate phrase with entries in the compilation data store 120, and identifies candidate phrase as a phrase in the search string 200 when the candidate phrase correlates with a phrase entry in the compilation data store 120.

In FIG. 2, a plurality of candidate phrases 220 are illustrated. Each of the candidate phrases 220 includes a set of words from the search string 200, as illustrated, as grouped by the phrase identifier 144. When grouping a set of words from the search string 200 into a candidate phrase 220, the phrase identifier 144 may eliminate or drop one or more words from a search string in any order, such as, for example, from left to right, right to left, at random, or according to some other suitable elimination algorithm or heuristic. In one embodiment, a weight may be assigned to each word in the search string, where a higher weight is attributed to a greater frequency of usage of a word in search strings generally. In this case, the phrase identifier 144 may prefer the elimination of a word assigned to a lower weight over a word assigned to a higher weight.

As illustrated in FIG. 2, each of the phrases 1-11 among in the candidate phrases 220 includes a different set of words. It should be appreciated that, in various embodiments, the phrase identifier 144 may create greater or fewer different sets of words depending upon various factors such as the likelihood of a set of words being identified as a phrase, the total number of permutations of each respective (i.e., different) combinations of words in the search string 200, and the processing capacity of the computing environment 110, for example.

After the candidate phrases 220 are grouped by the phrase identifier 144, the phrase identifier compares each of the candidate phrases 1-11 with entries in the compilation data store 120 and/or the third party compilation data store 170 (FIG. 1). That is, the candidate phrase 1, [Acme Brand Blue Ringo Rolling Tool Organizer], is compared with entries in the compilation data store 120, to determine whether the candidate phrase 1 correlates with a phrase entry in the compilation data store 120. In the example illustrated in FIG. 2, the candidate phrase 1 does not correlate with a phrase entry in the compilation data store 120. Thus, the candidate phrase 1 is disregarded as a possible phrase. Similarly, the candidate phrases 2, 3, 5, and 7-10 are disregarded as possible phrases, because none correlates with an entry in the compilation data store 120. On the other hand, the candidate phrases 4, 6, and 11 are identified as phrases, because each correlates with an entry in the compilation data store 120.

Here, it is noted that, when comparing the candidate phrases 220 with the compilation data store 120, each may be compared respectively to entries in the collaborative data store 122, the taxonomy data store 124, and the brand name data store 126. Further, it is noted that, when comparing each of the candidate phrases 202 with entries in the compilation data store 120, a candidate phrase may correlate with an entry in the collaborative data store 122 but not with any entries in the taxonomy data store 124 or the brand name data store 126. In certain aspects and embodiments, a weight may be attributed, respectively, to a correlation with the collaborative data store 122, the taxonomy data store 124, and the brand name data store 126, individually, as further described below.

Generally, a match or correlation of a candidate phrase with an entry in the compilation data store 120 indicates that the phrase is registered or recognized, in some form, among data maintained by the compilation data store 120. As described above, because the collaborative data store 122 comprises data from various sources such as a collaborative-type online encyclopedia, dictionary, library, lexical database of words and terms, or online social media network, for example, a match or correlation indicates a relative likelihood that the phrase would be recognized in common parlance.

In the example illustrated in FIG. 2, the candidate phrase 4, [Ringo Rolling Tool Organizer], the candidate phrase 6, [Tool Organizer], and the candidate phrase 11, [Acme Brand], are recognized respectively as phrases 202, 204, and 206. As also illustrated, the candidate phrases 202, 204, and 206 correlated, respectively, with different ones of the collaborative data store 122, the taxonomy data store 124, and the brand name data store 126. Particularly, the phrase 202 correlated with each of the collaborative data store 122, the taxonomy data store 124, and the brand name data store 126. On the other hand, the phrase 204 only correlated with the collaborative data store 122, and the phrase 206 only correlated with the taxonomy data store 124.

In the example illustrated in FIG. 2, correlation with the collaborative data store 122 is provided a weight of (0.3), correlation with the taxonomy data store 124 is provided a weight of (0.2), and collaboration with the brand name data store 126 is provided a weight of (0.5). These weights may be relied upon by the search query generator 146 when generating queries based on combinations of the words in the search string 200 and the phrases 202, 204, and 206 identified in the search string, as described in further detail below.

In some embodiments, individual words from search strings that are not identified as being part of a larger phrase may be treated as respective one-word phrases. In FIG. 2, for example, although the word "blue" was not identified as part of any of the phrases 202, 204, or 206, the word "blue" may be treated as a one-word phrase itself. In this context, generally, when individual words are treated as one-word phrases, certain weights, measures of trust, or other factors may be assigned to them for evaluating when to add or drop the one-word phrases from search queries. Further aspects of weights, measures of trust, and/or other factors assigned to phrases, for evaluating when to add or drop the phrases from search queries, are described in further detail below.

FIG. 3 illustrates example phrases 202, 204, and 206 and the generation of search queries 320 by the computing environment 110 of FIG. 1 according to various embodiments of the present disclosure. As illustrated in FIG. 3, the search query generator 146 relies upon the search string 200 and the phrases 202, 204, and 206 to generate the search queries 320.

In FIG. 3, a plurality of search queries 320 are illustrated. Each of the search queries 320 includes combination of words and/or phrases from the search string 200, as illustrated. When generating a combination of words and/or phrases from the search string 200, the search query generator 146 may eliminate or drop one or more words or phrases from a search string in any order, such as, for example, from left to right, right to left, at random, or according to another suitable elimination algorithm or heuristic described herein.

It is noted that, when generating the search queries 320, the search query generator 146 generally maintains phrases in their entirety. As illustrated in FIG. 3, the search query generator 146 has maintained each set of words in the phrases 202, 204, and 206 within the search queries 320. In other words, even when the word "blue" is dropped from the search string 200 in the generation of the search query 2, the phrases [Acme Brand] 202 and [Ringo Rolling Tool Organizer] 204 are maintained in their entirety. Stated differently, when the search query generator 146 removes or omits words or phrases from the search string 200 to generate alternate search queries, the search query generator 146 treats each of the phrases 202, 204, and 206 as a single "word" or "term" and, while dropping a phrase in its entirety, will not drop individual words within a phrase.

As an example heuristic for generating a search query, in embodiments where individual words that are not part of multiple-word phrases are treated as one-word phrases, the search query generator 146 may prefer to remove one-word phrases before removing multiple-word phrases. In other words, as one heuristic for generating a search query, the search query generator 146 may prefer to remove or omit phrases including a lesser number of words rather than phrases including a greater number of words. For example, in the generation of the search query 2, the one-word phrase "blue" has been removed, omitted, or dropped by the search query generator 146 because it has the least number of words in any phrase.

As another example heuristic for generating a search query, weights may be assigned to each identified phrase based on correlation with the data stores 122, 124, and 126, respectively. In this case, the search query generator 146 may prefer the elimination of a phrase assigned to a lower weight over a phrase assigned to a higher weight. Thus, according to the example weights illustrated in FIG. 2, the search query generator 146 may prefer to eliminate the phrase [Tool Organizer] 206, with a weight of (0.2), rather than the phrases [Ringo Rolling Tool Organizer] 204, having a weight of (0.3), or [Acme Brand] 202, having a weight of (1.0).

In another example heuristic for generating search queries, the search query generator 146 may prefer to maintain recognized brand names in search queries. Thus, if a set of words correlates with an entry in the brand name data store 126, that phrase may be preferred in search strings generated by the search query generator. In still another example, the search query generator 146 may generate a search query by removing or omitting one or more phrases from a search query based on the frequency at which the phrase appears in received search strings. As described above, the query statistics data store 130 may maintain data on the frequency in which certain words, terms, and phrases are included within search strings received by the computing environment 110. This data on the frequency of words, terms, and phrases in search strings may be relied upon as an input to the search query generator 146 when generating search queries. Thus, least- or most-frequently appearing phrases may be those selected for elimination or maintenance (i.e., keeping) within search queries.

In yet another example heuristic for generating search queries, the search query generator 146 may generate a search query by removing or omitting one or more phrases from a search query based on a measure of trust in each of the phrases. The measure of trust in each of the phrases may, in turn, be related to a measure of trust in the integrity of the data in the collaboration data store 122, the taxonomy data store 124, and the brand name data store 126. Other suitable heuristics for generating a search query are within the scope and spirit of the embodiments described herein, without limitation.

Further, the search query generator 146 may rely upon a function of any one or more heuristics for generating search queries. That is, the search query generator 146 may generate several respective search queries based on a function of one or more of the number of words in phrases, weights assigned or attributed to phrases, measures of trust assigned or attributed to phrases, whether or not a phrase includes a brand name, etc. Thus, combinations of heuristics may be taken into account and fine tuned by user input, for example, in various embodiments.

The number of search queries generated by the search query generator 146 may vary among embodiments. For example, in one embodiment, after the search query generator 146 generates the search query 1 in FIG. 3, the search query engine 148 may query the catalog of items 132 to determine whether a query result based on the search query 1 identifies at least a threshold number of items in the catalog of items 132. If the query result does not identify at least a threshold number of items in the catalog of items 132, then the search query generator 146 may generate the search query 2 as an alternate search query. In this context, the search query 2 comprises another combination of phrases and/or words from the search string 200. The search query engine 148 may then query the catalog of items 132 with the search query 2 to determine whether a query result based on the search query 2 identifies at least a threshold number of items in the catalog of items 132. This process may continue until enough query results are identified for display.

In other embodiments, the search query generator 146 may generate at least a predetermined number of different search queries, and the search query engine 148 may query the catalog of items 132 with each of the different search queries. In general, the search query generator 146 may generate a plurality of different search queries to ensure a sufficient number of search results surfaced or returned form the catalog of items 132, in response to a search string provided by a user.

FIG. 4 illustrates an example display 400 of search query results provided by the computing environment 110 of FIG. 1 according to various embodiments of the present disclosure. In FIG. 4, the display of the search results for searches 402, 404, 406, and 408 are illustrated. It may be assumed that the results illustrated in FIG. 4 for searches 402, 404, 406, and 408 are returned from the catalog of items 132 based on queries performed by the search query engine 148. Particularly, the search 402 corresponds to query 2 in FIG. 3, the search 404 corresponds to query 3 in FIG. 3, the search 406 corresponds to query 5 in FIG. 3, and the search 408 corresponds to query 4 in FIG. 3. It may also be assumed that the query 1 in FIG. 3 returned little or no relevant results because it was constrained by too many terms, for example. For each of the searches 402, 404, 406, and 408 illustrated in FIG. 4, phrases in the search queries are identified by brackets, and words or phrases removed or omitted from the search queries are identified by strikethrough.

According to one embodiment, the display 400 separates the query results for each of the searches 402, 404, 406, and 408, individually, wherein the results are provided in response to queries by the search query engine 148 (FIG. 1) to the catalog of items 132. The display 400 may be rendered on a display device of the client device 160, for example. Each of the searches or queries 402, 404, 406, and 408 illustrates a variation on the original search string 200. According to certain aspects, the display 400 of results for the searches 402, 404, 406, and 408 provides a clear indication that different results were generated for each of the searches 402, 404, 406, and 408.

Based on the display 400, a user may appreciate that an original search string (e.g., the search string 200) was too narrow or constrained. On the other hand, each alternate search or query 402, 404, 406, and 408 comprises an altered version of the search string 200, for example, with fewer words or phrases to constrain the search.

According to one embodiment, a limited number of groups of results are selected for display on the display 400. For example, the number of groups of results may depend upon the number of different search queries generated by the search query generator 146, as discussed above in connection with FIG. 3, for example. In one embodiment, all search queries that surface or return at least a predetermined number of return results are presented on the display 400. To this end, a scrolling mechanism may be employed in cases where the groups presented do not fit within a single screen of the display 400. Groups of results may be presented on the display 400 according to a certain order or priority, such as, for example, a number of items within a given group, the prices associated with items in a group, the availability of items within a groups, or other factors.

The fact that results are displayed on the display 400 in separate groups along with the corresponding searches 402, 404, 406, and 408 allows a user to identify how variations or permutations on the original search string 200 return different results. As a consequence, the user may further recognize or appreciate that an online merchant carries products relevant to their search. Also, the user can identify how altered search strings may result in the return of different search results.

Figure 5:
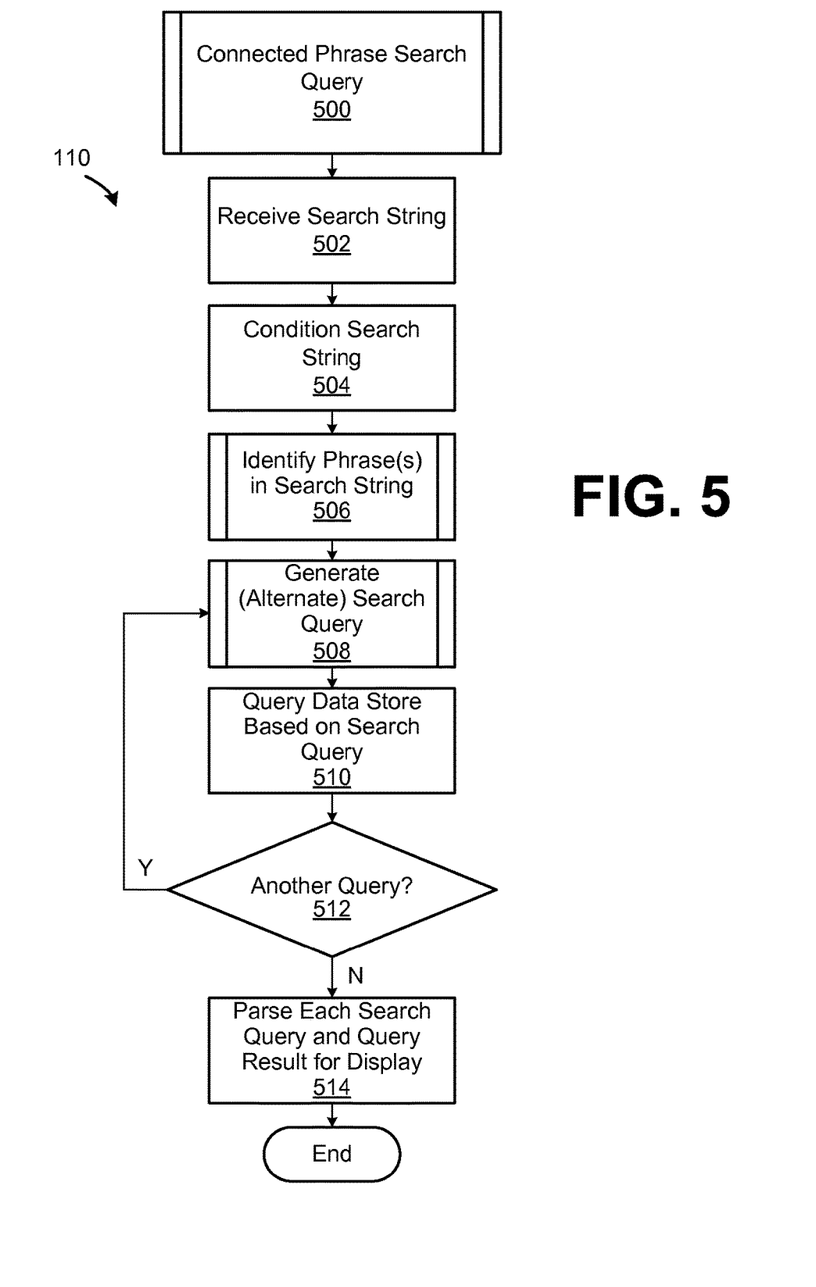
FIG. 5 illustrates an example connected phrase search query process performed by the computing environment of FIG. 1 according to various embodiments of the present disclosure.
Figure 6:
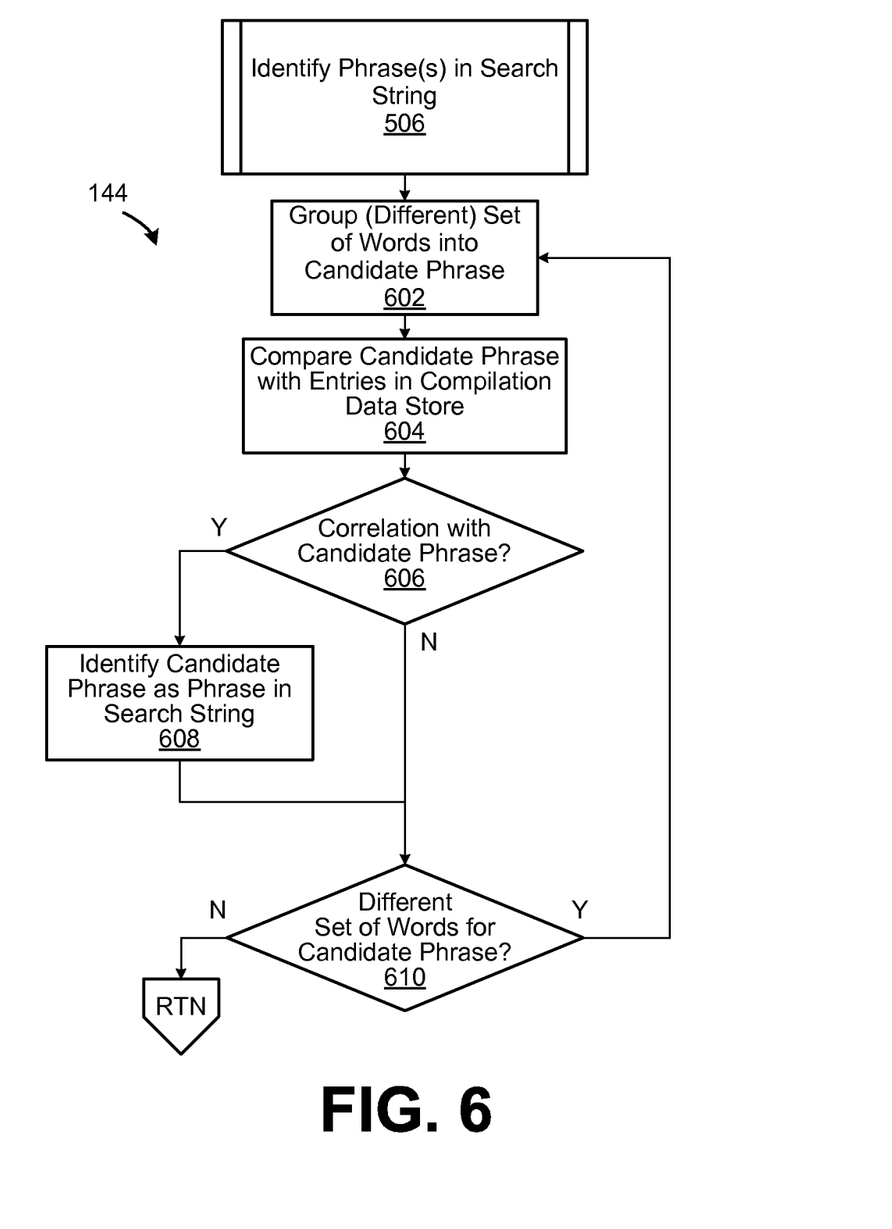
FIG. 6 illustrates an example phrase identification process performed by the computing environment of FIG. 1 according to various embodiments of the present disclosure.
Figure 7:
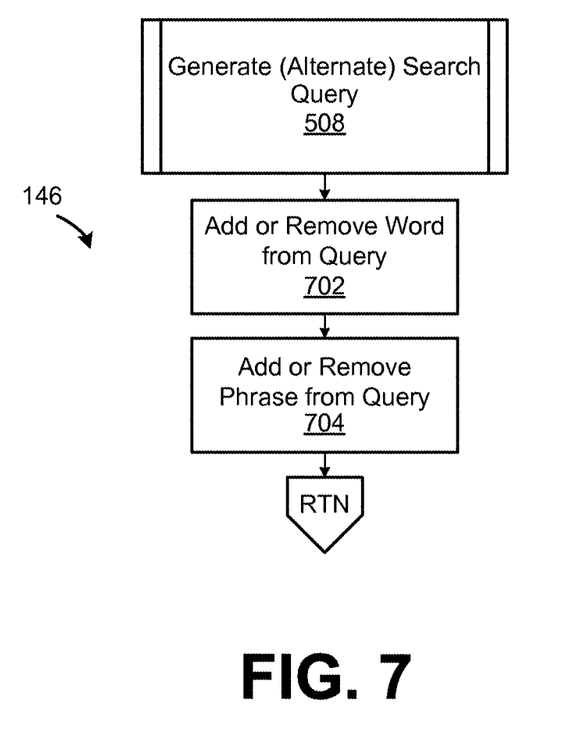
FIG. 7 illustrates an example search query generation process performed by the computing environment of FIG. 1 according to various embodiments of the present disclosure.

Referring next to FIGS. 5-7, flowcharts illustrating example processes performed by the provider computing environment 110 are provided. It is understood that the flowcharts of FIGS. 5-7 provide merely one example of various functional arrangements that may be employed to implement the operations of the provider computing environment 110, as described herein. In certain aspects, the flowcharts of FIGS. 5-7 may be viewed as depicting an example of steps performed by the provider computing environment 110 according to one or more embodiments.

FIG. 5 illustrates an example connected phrase search query process 500 performed by the computing environment 110 of FIG. 1 according to various embodiments of the present disclosure. Starting at reference numeral 502, the process 500 includes receiving a search string. According to the examples described above, in one embodiment, the search string 200 (FIG. 2) may be received by the computing environment 110 from the client device 160 (FIG. 1) at reference numeral 502. It should be appreciated that any search string including a combination of words, for example, may be received at reference numeral 502, and the search string 200 is provided by way of example and not limitation.

Proceeding to reference numeral 504, the process 500 includes conditioning the search string for a query. For example, the search query received at reference numeral 502 may be conditioned by removing or omitting extraneous, duplicate, or misspelled words. The conditioning may be performed by the search string conditioner 142 of the computing environment 110 (FIG. 1), for example, and include a spelling correction on one or more words in the search string 200 or removal of words known to have little relevance to a search.

After reference numeral 504, the process 500 proceeds to reference numeral 506, for identifying phrases in the search string with reference to a compilation data store. Identifying phrases at reference numeral 506 may include grouping a set of words from the search string received at reference numeral 502 into a candidate phrase, and comparing the candidate phrase against a compilation data store to identify a phrase with reference to known entries in the compilation data store. In connection with the example embodiment described in FIGS. 2 and 3, at reference numeral 506, the phrase identifier 144 of the computing environment 110 (FIG. 1) may group sets of words from the search string into candidate phrases, and compare the candidate phrases against known entries in the compilation data store 120. Further aspects of identifying phrases at reference numeral 506 are described with reference to FIG. 6 below.

Continuing to reference numeral 508, the process 500 includes generating a search query including a combination of one or more of the phrases identified at reference numeral 506. As described above with reference to FIG. 3, for example, one or more of the search queries 320 may be generated by the search query generator 146 of the computing environment 110 (FIG. 1) at reference numeral 508. After a search query is generated at reference numeral 508, the process 500 proceeds to reference numeral 510, for querying a catalog of items based on the search query to generate a query result. For example, the search query may be submitted by the search query engine 148 of the computing environment 110 to the catalog of items 132 associated with an electronic commerce system (FIG. 1).

At reference numeral 512, the process 500 includes determining whether to perform another search query. For example, at reference numeral 512, the process 500 may include determining whether a result of the query performed at reference numeral 510 returned at least a threshold number of items. For example, if a search query submitted by the search query engine 148 to the catalog of items 132 does not identify at least a threshold number of items, the process 500 may determine at reference numeral 512 that it is necessary to generate an alternate search query.

Here, it should be appreciated that the determination on whether to perform another search query at reference numeral 512 may depend on various factors on combinations of factors. For example, in various embodiments, at least a predetermined number of queries may be required. In other embodiments, the number of queries may depend upon a current processing load of the computing environment 110, for example, or a minimum number of results returned, regardless of the number of queries necessary to identify the minimum number of results.

If it is determined at reference numeral 512 to perform another query, then the process 500 proceeds back to reference numeral 508, so that an alternate search query may be generated, and the process 500 continues. In this case, generally, an alternate search query including another combination of one or more phrases is generated at reference numeral 508, according to any of the example embodiments described herein. Further aspects of generating search queries and alternate search queries at reference numeral 508 are described with reference to FIG. 7 below.

Alternatively, if it is determined at reference numeral 512 not to perform another query, then the process 500 proceeds to reference numeral 514. At reference numeral 514, the process 500 includes parsing the search query or queries generated at reference numeral 508 in connection with the query results identified at reference numeral 510 for display. For example, any search queries generated at reference numeral 508 may be parsed in connection with the query results identified at reference numeral 510 to generate a webpage for display on the client device 160 (FIG. 1). In one embodiment, the webpage parsed and/or generated at reference numeral 514 may be rendered by the client device 160 to provide a display similar to the display 400 of FIG. 4. As described above, the results parsed at reference numeral 514 may assist a user to identify how variations or permutations on an original search string may return different results. As a consequence, the user may further recognize or appreciate that an online merchant carries products relevant to their search.

FIG. 6 illustrates an example phrase identification process 506 performed by the phrase identifier 144 of the computing environment 110 of FIG. 1 according to various embodiments of the present disclosure. Beginning at reference numeral 602, the process 506 includes grouping a set of words from a search string into a candidate phrase. The grouping of words from a search string into a candidate phrase at reference numeral 602 may be performed in a manner similar to that described above in connection with FIG. 2. That is, for example, the phrase identifier 144 (FIGS. 1 and 2) may eliminate or drop one or more words from the search string 200 in any order, such as from left to right, right to left, at random, or according to some other suitable elimination algorithm or heuristic described herein, to generate a candidate phrase.

At reference numeral 604, the process 506 includes comparing the candidate phrase generated at reference numeral 602 with entries in a compilation data store. Again, with reference to the example embodiment of FIG. 2, any of the candidate phrases 220 may be compared against entries in the compilation data store 120. As described above, the compilation data store may include various types of data stores, including the collaborative data store 122, the taxonomy data store 124, and the brand name data store 126.

At reference numeral 606, the process 506 determines whether a candidate phrases correlates with an entry in the compilation data store. When a candidate phrase correlates with an entry in the compilation data store, the candidate phrase is identified as a phrase in the search string, at reference numeral 608, and the process proceeds to reference numeral 610. On the other hand, in certain aspects, when the candidate phrase does not correlate with an entry in the compilation data store, the process 506 proceeds to reference numeral 610. At reference numeral 610, it is determined whether a different set of words exists for an alternate candidate phrase. Here, it is generally noted that, among embodiments, the process 506 seeks to identify phrases among various combinations of words from the search string received at reference numeral 502.

If it is determined at reference numeral 610 that a different combination or set of words may be derived from the search string, then the process proceeds back to reference numeral 602 for grouping an alternate set of words from the search string as an alternate candidate phrase. In this context, grouping a different set of words may include removing or adding words from the search string, to generate an alternate candidate phrase. In turn, the alternate candidate phrase may be compared against entries in the compilation data store at reference numeral 604, and the process 506 continues to identify various phrases. In the context of the example embodiment of FIG. 2, according to the iterative nature of the process 506, each of the phrases 220 in FIG. 2 may be identified based on the search string 200. After phrases are identified, the process 506 in FIG. 6 returns to the process 500 of FIG. 5.

FIG. 7 illustrates an example search query generation process 508 performed by the search query generator 146 of the computing environment 110 of FIG. 1 according to various embodiments of the present disclosure. Generally, generating a search query or alternate search query according to the process 508 includes one or more of adding or removing a word from a search query at reference numeral 702 and/or adding or removing a phrase from a search query at reference numeral 704.

For example, as described above with reference to FIG. 3, one or more of the search queries 320 may be generated at reference numeral 702 by removing or adding the word "blue," which is not part of a phrase. Similarly, one or more of the search queries 320 may be generated by adding or removing the phrases [Ringo Rolling Tool Organizer], [Tool Organizer], or [Acme Brand] from search queries. These phrases may be added or removed based on, for example, a measure of trust in the compilation data store (e.g., the compilation data store 120 of FIG. 1) used to identify the phrases, or a frequency of appearance of the phrases in received search strings (e.g., as indicated in the query statistics data store 130 of FIG. 1). In certain embodiments, when generating search queries, least-frequently appearing phrases may be removed first based on the frequency of appearance of phrases in received search strings. In other embodiments, a phrase may be maintained in a search query, if the phrase includes a brand name.

Here, it is noted that, when generating search queries, the integrity of phrases are generally maintained. In other words, a single word from a phrase may not be removed according to the process 508, although a single word that is not part of a phrase may be removed. It is noted that the examples of adding and removing words and phrases during the generation of search queries are not intended to be exhaustive or limiting, as other suitable processes for generating search queries are within the scope a spirit of the embodiments described herein. After generating a search query, the process 508 in FIG. 7 returns to the process 500 of FIG. 5.

Figure 8:
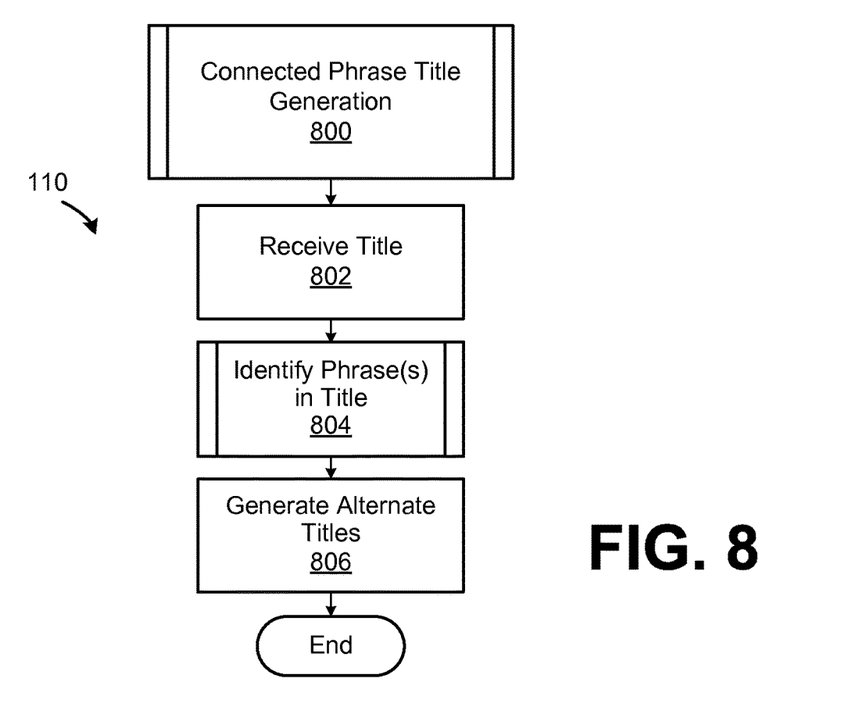
FIG. 8 illustrates an example connected phrase title generation process of the computing environment of FIG. 1 according to various embodiments of the present disclosure.

According to another embodiment of the present disclosure, FIG. 8 illustrates an example connected phrase title generation process 800 of the computing environment 110 of FIG. 1. In the context of FIG. 8, it is noted that the identification of phrases, as described herein, may be applicable to fields other than the generation of search queries. For example, the identification of phrases may be applicable to generating connected phrase titles.

In the process 800, a title is received at reference numeral 802. The title may be the title of a product or service, for example. At reference numeral 804, one or more phrases in the title are identified. The identification of phrases at reference numeral 804 may be achieved in a manner similar to that described herein with reference to FIGS. 2 and 6, for example. Once phrases are identified in the title, one or more alternate titles may be generated at reference numeral 806. As one example, an entire phrase in the title received at reference numeral 802 may be removed, to generate a title at reference numeral 806. In general, once phrases within a title are identified, new titles may be generated at reference 806 in a manner similar to that described herein with reference to FIGS. 3 and 7, for example. It should be appreciated that the identification of phrases, as described herein, may be applicable to fields other than the generation of search queries or titles.

Figure 9:
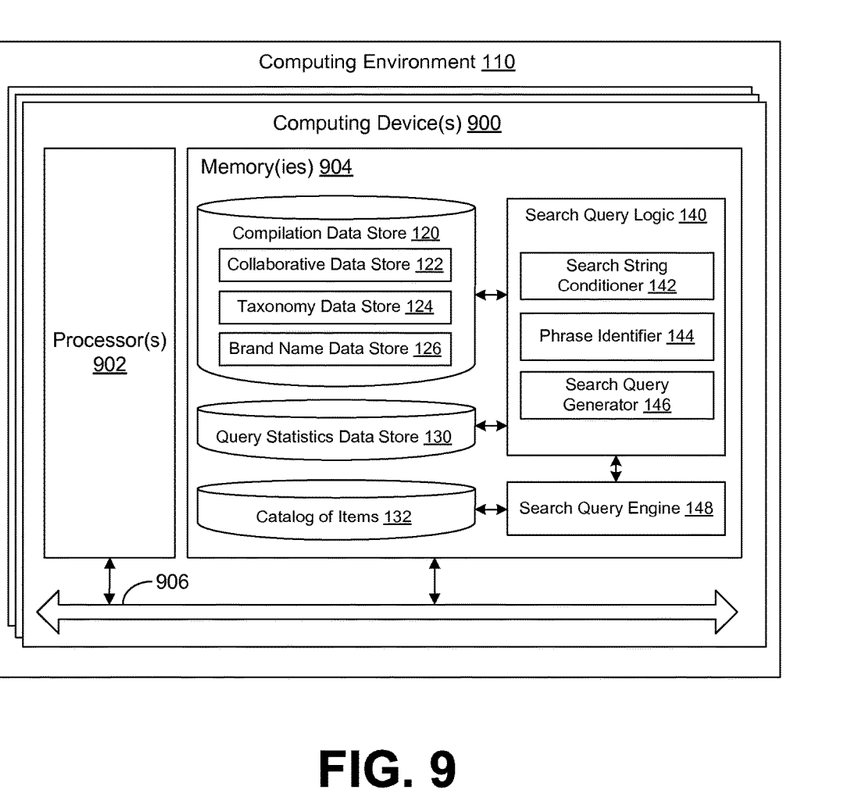
FIG. 9 illustrates an example schematic block diagram of the computing environment employed in the networked environment of FIG. 1 according to various embodiments of the present disclosure.

FIG. 9 illustrates an example schematic block diagram of the computing environment 110 employed in the networked environment 100 of FIG. 1 according to various embodiments of the present disclosure. The computing environment 110 includes one or more computing devices 900. Each computing device 900 includes at least one processing system, for example, having a processor 902 and a memory 904, both of which are electrically and communicatively coupled to a local interface 906. To this end, each computing device 900 may comprise, for example, at least one server computer or similar device. The local interface 906 may comprise, for example, a data bus with an accompanying address/control bus or other bus structure as can be appreciated.

In various embodiments, the memory 904 stores data and software or executable-code components executable by the processor 902. For example, the memory 904 may store executable-code components associated with the search query logic 140 and the search query engine 148, for execution by the processor 902. The memory 904 may also store data such as that stored in the compilation data store 120, the query statistics data store 130, and the catalog of items 132, among other data.

It should be understood and appreciated that the memory 904 may store other executable-code components for execution by the processor 902. For example, an operating system may be stored in the memory 904 for execution by the processor 902. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 904 stores software for execution by the processor 902. In this respect, the terms "executable" or "for execution" refer to software forms that can ultimately be run or executed by the processor 902, whether in source, object, machine, or other form. Examples of executable programs include, for example, a compiled program that can be translated into a machine code format and loaded into a random access portion of the memory 904 and executed by the processor 902, source code that can be expressed in an object code format and loaded into a random access portion of the memory 904 and executed by the processor 902, or source code that can be interpreted by another executable program to generate instructions in a random access portion of the memory 904 and executed by the processor 902, etc. An executable program may be stored in any portion or component of the memory 904 including, for example, a random access memory (RAM), read-only memory (ROM), magnetic or other hard disk drive, solid-state, semiconductor, or similar drive, USB flash drive, memory card, optical disc (e.g., compact disc (CD) or digital versatile disc (DVD)), floppy disk, magnetic tape, or other memory component.

In various embodiments, the memory 904 may include both volatile and nonvolatile memory and data storage components. Volatile components are those that do not retain data values upon loss of power. Nonvolatile components are those that retain data upon a loss of power. Thus, the memory 904 may comprise, for example, a random access memory (RAM), read-only memory (ROM), magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may comprise, for example, a static random access memory (SRAM), dynamic random access memory (DRAM), or magnetic random access memory (MRAM), and/or other similar memory device. The ROM may comprise, for example, a programmable read-only memory (PROM), erasable programmable read-only memory (EPROM), electrically erasable programmable read-only memory (EEPROM), or other similar memory device.

Also, the processor 902 may represent multiple processors 902 and/or multiple processor cores and the memory 904 may represent multiple memories that operate in parallel, respectively, or in combination. Thus, the local interface 906 may be an appropriate network or bus that facilitates communication between any two of the multiple processors 902, between any processor 902 and any of the memories 904, or between any two of the memories 904, etc. The local interface 906 may comprise additional systems designed to coordinate this communication, including, for example, a load balancer that performs load balancing. The processor 902 may be of electrical or of some other available construction.

As discussed above, the search query logic 140, the search query engine 148, and the logical elements thereof may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts or process diagrams of FIGS. 5-7 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 902. The machine code may be converted from the source code, etc. Further, each block may represent, or be connected with, a circuit or a number of interconnected circuits to implement a certain logical function or process step.

Although the flowcharts or process diagrams of FIGS. 5-7 illustrate a specific order, it is understood that the order may differ from that which is depicted. For example, an order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search query logic 140, the search query engine, and the logical elements thereof that comprise software or executable-code components, can be embodied or stored in any tangible or non-transitory computer-readable medium or device for execution by an instruction execution system such as a general purpose processor. In this sense, the logic may comprise, for example, software or executable-code components that can be fetched from the computer-readable medium and executed by the instruction execution system. Thus, the instruction execution system may be directed by execution of the instructions to perform certain processes such as those illustrated in FIGS. 5-7. In the context of the present disclosure, a "computer-readable medium" can be any tangible medium that can contain, store, or maintain any logic, application, software, or executable-code component described herein for use by or in connection with an instruction execution system.

The computer-readable medium can comprise any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may comprise a random access memory (RAM) including, for example, a static random access memory (SRAM), dynamic random access memory (DRAM), or magnetic random access memory (MRAM). In addition, the computer-readable medium may comprise a read-only memory (ROM), a programmable read-only memory (PROM), an erasable programmable read-only memory (EPROM), an electrically erasable programmable read-only memory (EEPROM), or other similar memory device.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, at least the following is claimed:

1. A non-transitory computer-readable medium embodying a program that, when executed by at least one computing device, directs the at least one computing device to perform a method comprising:
   conditioning a search string for a query;
   grouping a set of words from the search string into a candidate phrase;
   comparing the candidate phrase with a plurality of entries in a compilation data store;
   identifying, by the at least one computing device, the candidate phrase as a phrase in the search string based on a correlation of the candidate phrase with at least one of the plurality of entries in the compilation data store;
   generating, by the at least one computing device, a search query including a combination of a word in the search string and the phrase in the search string based on a weight attributed to at least one of the word in the search string or the phrase in the search string;
   querying a catalog of items associated with an electronic commerce system based on the search query to generate a query result; and
   parsing the search query and the query result for display.

2. The non-transitory computer-readable medium according to claim 1, wherein the method further comprises identifying a plurality of phrases in the search string based on a correlation of a plurality of candidate phrases with at least one of the plurality of entries in the compilation data store.

3. The non-transitory computer-readable medium according to claim 2, wherein the method further comprises generating the search query by:
   omitting at least one of the plurality of phrases in the search string from the search query; and
   omitting at least one word in the search string from the search query.

4. A system, comprising:
   a compilation data store including at least one of collaborative data, taxonomy data, and brand name data; and
   at least one computing device coupled to the compilation data store and configured to:
      group sets of words from a search string from a client device into a plurality of candidate phrases;
      identify a plurality of phrases in the search string through a comparison of the plurality of candidate phrases with a plurality of entries in the compilation data store;
      generate a search query including a combination of a word in the search string and a phrase among the plurality of phrases in the search string based on a weight attributed to at least one of the word in the search string or the phrase in the search string;
      query a catalog of items associated with an electronic commerce system based on the search query to generate a query result; and
      parse the search query and the query result for display.

5. The system according to claim 4, wherein the at least one computing device is further configured to parse the search query and the query result for display on the client device.

6. The system according to claim 4, wherein the at least one computing device is further configured to condition the search string by removing at least one extraneous, duplicate, or misspelled word from the search string.

7. The system according to claim 4, wherein, to identify the plurality of phrases in the search string, the at least one computing device is further configured to:
   compare each of the plurality of candidate phrases with the plurality of entries in the compilation data store; and
   for each of the plurality of candidate phrases that correlates with at least one of the plurality of entries in the compilation data store, identify the respective candidate phrase as one of the plurality of phrases in the search string.

8. The system according to claim 4, wherein the at least one computing device is further configured to:
   determine whether the query result identifies at least a threshold number of items in the catalog of items; and
   in response to the query result identifying less than the threshold number of items in the catalog of items, generate an alternate search query including another combination of the plurality of phrases in the search string based on a respective weight attributed to each of the plurality of phrases in the search string.

9. The system according to claim 8, wherein the at least one computing device is further configured to omit at least one of the plurality of phrases in the search string from the search query based on a measure of trust in the compilation data store.

10. The system according to claim 8, wherein the at least one computing device is further configured to omit at least one of the plurality of phrases in the search string from the search query based on a frequency of appearance of each of the plurality of phrases in received search strings.

11. A method, comprising:
    grouping, by at least one computing device, a set of words from a search string from a client device into a candidate phrase;
    identifying, by the at least one computing device, a phrase in the search string through a comparison of the candidate phrase with a plurality of entries in a compilation data store;
    generating, by the at least one computing device, a search query including a word in the search string and the phrase in the search string based on a weight attributed to at least one of the word in the search string or the phrase in the search string;
    querying a catalog of items associated with an electronic commerce system based on the search query to generate a query result; and
    parsing the search query and the query result for display.

12. The method according to claim 11, wherein identifying the phrase comprises:
    comparing the candidate phrase with the plurality of entries in the compilation data store; and
    based on a result of the comparing, grouping a different set of words from the search string into an alternate candidate phrase and comparing the alternate candidate phrase with the plurality of entries in the compilation data store.

13. The method according to claim 12, wherein grouping the different set of words from the search string comprises at least one of:
    removing a word in the search string from the set of words; and
    adding a word in the search string to the set of words.

14. The method according to claim 11, further comprising:

determining whether the query result identifies at least a threshold number of items in the catalog of items; and in response to the query result identifying less than the threshold number of items in the catalog of items, generating an alternate search query based on the search string.

15. The method according to claim 14, wherein generating the alternate search query based on the search string comprises removing a word from the search query other than a word in the phrase.

16. The method according to claim 14, wherein:

identifying the phrase in the search string comprises identifying a plurality of phrases in the search string; and generating the alternate search query comprises removing at least one of the plurality of phrases in the search string from the search query based on a measure of trust attributed to at least one of the plurality of phrases.

17. The method according to claim 14, wherein:

identifying the phrase in the search string comprises identifying a plurality of phrases in the search string; and generating the alternate search query comprises removing at least one of the plurality of phrases in the search string from the search query based on a frequency of appearance of the plurality of phrases in received search strings.

18. The method according to claim 14, wherein:

identifying the phrase in the search string comprises identifying a plurality of phrases in the search string; and generating the alternate search query comprises removing at least one of the plurality of phrases in the search string from the search query based on a weight attributed to at least one of the plurality of phrases in the search string.

19. The method according to claim 11, wherein:

the search string comprises a title;

identifying the phrase comprises identifying a phrase in the title with reference to the compilation data store; and generating the search query comprises generating an alternate title based on the phrase in the title.

20. The method according to claim 19, wherein:

identifying the phrase in the title comprises grouping a set of words from the title into a candidate phrase in the title; and the method further comprises:

comparing the candidate phrase in the title with the plurality of entries in the compilation data store; and based in part on a result of the comparing, identifying the candidate phrase in the title as the phrase in the title.

* * * * *